(12) United States Patent
Bruemmer et al.

(10) Patent No.: US 9,694,666 B2
(45) Date of Patent: Jul. 4, 2017

(54) MOTOR VEHICLE HAVING A RADIATOR ARRANGEMENT

(71) Applicant: Mahle International GmbH, Stuttgart (DE)

(72) Inventors: Richard Bruemmer, Stuttgart (DE); Peter Griesheimer, Stuttgart (DE); Andreas Kleber, Marbach (DE); Volker Kurz, Stuttgart (DE); Uwe Aschermann, Karlsruhe (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/097,256

(22) Filed: Apr. 12, 2016

(65) Prior Publication Data

US 2016/0297294 A1    Oct. 13, 2016

(30) Foreign Application Priority Data

Apr. 13, 2015   (DE) .......................... 10 2015 206 549

(51) Int. Cl.
| | |
|---|---|
| *B60K 11/00* | (2006.01) |
| *B60K 11/04* | (2006.01) |
| *B60K 11/08* | (2006.01) |

(52) U.S. Cl.
CPC .............. *B60K 11/04* (2013.01); *B60K 11/08* (2013.01); *B60Y 2200/14* (2013.01)

(58) Field of Classification Search
CPC ......... B60K 11/00; B60K 11/02; B60K 11/04; B60K 11/06; B60K 11/08
See application file for complete search history.

(56) References Cited

U.S. PATENT DOCUMENTS

| | | | |
|---|---|---|---|
| 2013/0220577 A1* | 8/2013 | Bignon | B60K 11/085 165/98 |
| 2016/0052559 A1 | 2/2016 | Schmidt et al. | |

FOREIGN PATENT DOCUMENTS

| | | |
|---|---|---|
| DE | 8234137 U1 | 5/1983 |
| DE | 102007007938 A1 | 8/2008 |
| DE | 102010048642 A1 | 6/2011 |
| DE | 102013103551 A1 | 10/2014 |

(Continued)

OTHER PUBLICATIONS

English abstract for JP 2005 096684 A.
(Continued)

*Primary Examiner* — John Walters
*Assistant Examiner* — James Triggs
(74) *Attorney, Agent, or Firm* — Fishman Stewart PLLC

(57) ABSTRACT

A motor vehicle may include a radiator arrangement. The radiator arrangement may include a radiator grill having a cooling air inlet and a radiator arranged behind the cooling air inlet with respect to a forward traveling direction. A flow-directing device may be arranged to direct a cooling air flow from the cooling air inlet to the radiator. The flow-directing device may include at least one baffle element disposed on a radiator-grill side of the radiator arrangement and at least one other baffle element disposed on a radiator side. Additionally or alternatively, the flow-directing device may include a bellows arranged on the radiator-grill side or on the radiator side. Additionally or alternatively, the flow-directing device may include at least one rail including a groove and at least one rail baffle element guided in the at least one guide groove.

20 Claims, 4 Drawing Sheets

(56) References Cited

FOREIGN PATENT DOCUMENTS

JP           2005096684 A     4/2005
JP           2007001503 A     1/2007

OTHER PUBLICATIONS

English abstract for JP 2007 001503 A.
English abstract for DE 10 2007 007938 A1.
European Search Report EP 16163245.0, dated Aug. 17, 2016.
English abstract for DE-102010048642.

\* cited by examiner

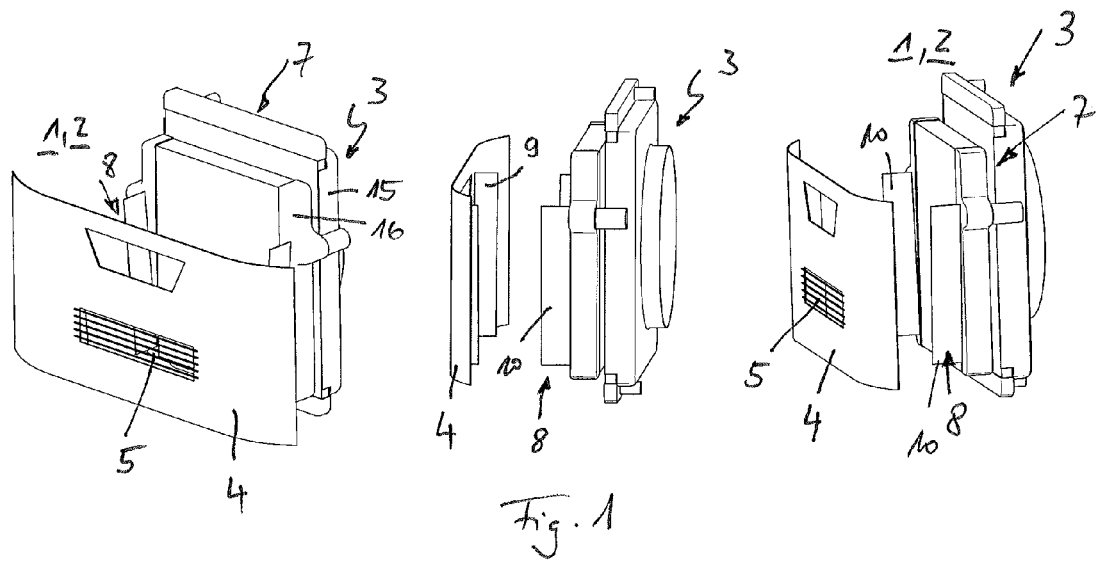
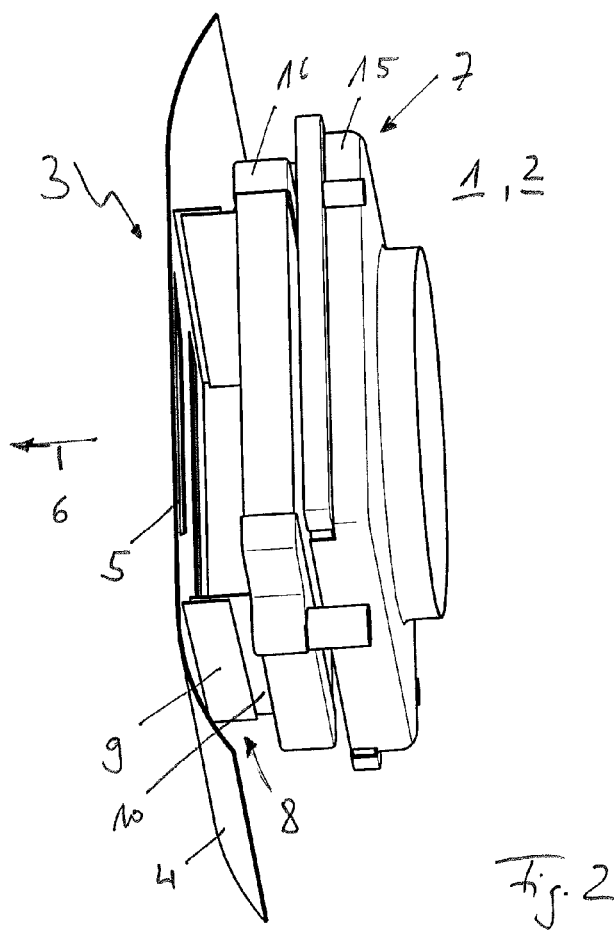

MOTOR VEHICLE HAVING A RADIATOR ARRANGEMENT

CROSS-REFERENCE TO RELATED APPLICATIONS

This application claims priority to German Patent Application No. 10 2015 206 549.9, filed Apr. 13, 2015, the contents of which are hereby incorporated by reference in its entirety.

TECHNICAL FIELD

The present invention relates to a motor vehicle having a radiator arrangement, which has a radiator grille with a cooling air inlet and has a radiator arranged behind the cooling air inlet when viewed in the direction of travel.

BACKGROUND

DE 10 2010 048 642 A1 discloses a motor vehicle of the type in question having a radiator arrangement, which has a radiator grille with a cooling air inlet and has a radiator arranged behind the cooling air inlet when viewed in the direction of travel. In addition, a flow-directing device is provided, which directs a cooling air flow from the cooling air inlet to the radiator. Here, this flow-directing device forms an air duct which is closed at the outer circumference and, in particular, is intended to prevent heated cooling air that has already flowed through the radiator and is flowing back in the direction of the cooling air inlet from re-entering an inflow region of the radiator. The intention is to achieve improved cooling capacity by this means.

In general, the air mass flow through the radiator of a motor vehicle can be produced by a fan or, alternatively, by the dynamic pressure of the moving motor vehicle. However, if there are gaps between the radiator and a cooling air inlet situated on the radiator-grille side of the motor vehicle, an unwanted bypass flow can arise, bypassing the radiator and thereby reducing the cooling capacity thereof. In addition, a high pressure can arise on the outflow side of the fan owing to the operation of said fan, particularly when a motor vehicle is stationary, said pressure ensuring that a recirculatory flow arises through gaps between the radiator and the radiator grille, carrying heated cooling air back to the radiator and thereby likewise reducing the cooling capacity thereof.

The flow-directing device known from the prior art is only suitable for use with a passenger vehicle and cannot be used in a commercial vehicle, owing to the specific installation geometry thereof.

SUMMARY

The present invention is therefore concerned with the problem of specifying an improved or at least alternative embodiment for a motor vehicle of the type in question, said embodiment being distinguished, in particular, by an increased cooling capacity in a motor vehicle designed as a commercial vehicle.

According to the invention, this problem is solved by the subject matter of independent claim(s). Advantageous embodiments form the subject matter of the dependent claims.

The present invention is based on the general concept of, for the first time, transferring the principle known from the passenger vehicle sector of a seal between a radiator grille and a radiator arranged behind the latter in the direction of travel to a commercial vehicle while at the same time taking into account the special installation situation in commercial vehicles through a special configuration of the flow-directing device. Here, the motor vehicle, which is designed as a commercial vehicle according to the invention, has a radiator arrangement having a radiator grille and a cooling air inlet and has a radiator arranged behind the cooling air inlet when viewed in the direction of travel, and likewise has the flow-directing device as mentioned above, which directs a cooling air flow from the cooling air inlet to the radiator. In order now to be able to adapt the flow-directing device to the specific conditions in a commercial vehicle, this device has alternate baffle elements on the radiator-grille side and on the radiator side which overlap in the installed state, or has a bellows or flexible frame arranged on the radiator-grille side or on the radiator side, which is extended and fixed on the oppositely situated radiator or radiator grille when the radiator grille is installed, or at least one rail having a guide groove, in particular a keder rail, and at least one baffle element guided therein, thereby likewise making it possible to enforce duct-type flow between the cooling air inlet and the radiator and thereby significantly improve the cooling capacity of the radiator since, in particular, "gap losses" or unwanted bypass flow can likewise be avoided, e.g. recirculation of cooling air that has already flowed through the radiator. Here, the three alternatives represent respective embodiments which are specifically directed to the installation situation in commercial vehicles and, as a result, can be used in a commercial vehicle in a hitherto completely unknown way.

In the case of commercial vehicles, a "viscous fan" mounted firmly on an internal combustion engine is generally used. The viscous fan must be installed even before the actual radiator because it can no longer be reached after the installation of the latter. Towards the front, the installation space is bounded by the radiator grille. For this reason, the radiator can only be installed in the commercial vehicle from above or from below. At the same time, the available installation space is limited, and therefore the radiator cannot be pushed forwards to a significant extent into cavities in the radiator grille without catching on the fan during installation. During installation, after being lowered into the commercial vehicle, the radiator is indeed normally pushed back somewhat in order to be able to ensure that the fan overlaps the entry of the inlet nozzle. All three alternative embodiments of the solution according to the invention allow the radiator to be installed in what is a relatively restricted installation space, i.e. either from below or from above, and nevertheless prevent the bypass flow which reduces the cooling capacity and therefore must absolutely be avoided.

In an advantageous development of the solution according to the invention, in accordance with the first alternative, in which the flow-directing device has baffle elements on the radiator side and baffle elements on the radiator-grille side which overlap in the installed state, the baffle elements on the radiator-grille side and the baffle elements on the radiator side are arranged in a V shape and thereby simultaneously form a guide for the insertion of the radiator. Here, the V shape can widen either downwards or upwards, depending on the direction in which the radiator is to be inserted into the installation space. If it opens downwards, the baffle element on the radiator-grille side lies within the baffle element on the radiator side in order to be able to ensure interengagement in the manner of a funnel. If, on the other hand, the V shape opens upwards, the baffle elements on the radiator side are arranged within the baffle elements on the radiator-grille side when the radiator is installed from above. In this context, it is, of course, possible to provide not only lateral baffle elements but, of course, also baffle elements arranged at the bottom and top in order, where possible, to be able to produce a preferably completely closed cooling duct on completion of installation. Of course, individual locations can also be left free here in order, for example, not to hinder passages or projecting parts of the radiator.

In an advantageous development of the solution according to the invention, in accordance with the first alternative, the baffle elements on the radiator-grille side are arranged in a fixed manner on the radiator grille, in particular even being formed integrally therewith, and/or the baffle elements on the radiator side are arranged in a fixed manner on the radiator, in particular even being formed integrally therewith. It is thereby possible to make the manufacture of the baffle elements on the radiator-grille side and/or on the radiator side significantly less expensive since they can be produced or manufactured in a joint process step with the radiator grille and/or the radiator, for example. As an alternative, it is also conceivable for the baffle elements on the radiator-grille side and/or on the radiator side to be arranged in a fixed manner on a separate frame, in particular even being formed integrally therewith. In this case, the frame is arranged on the radiator grille or on the radiator.

In another advantageous embodiment of the solution according to the invention, in accordance with the first alternative, the baffle elements on the radiator-grille side, are arranged pivotably on the radiator grille, in particular by means of a film hinge, wherein, in addition or as an alternative, the baffle elements on the radiator side are arranged pivotably on the radiator, in particular by means of a film hinge. This allows a particularly shallow embodiment both of the baffle elements on the radiator-grille side and on the radiator side, with these then being opened out only when the radiator has been fully installed and forming the cooling duct and the flow-directing device. An embodiment of this kind is also economical to implement and simple to install.

In an advantageous development of the solution according to the invention, in accordance with the third alternative, a rail with a guide groove, in particular a keder rail, is arranged at least on the radiator grille and on the radiator in each case, wherein the baffle element guided therein is additionally threaded into the opposite keder rail on the oppositely situated radiator and radiator grille, respectively, after installation. It is thereby possible, for example, to implement the flow-directing device initially only in the manner of rails, in particular keder rails, provided on the radiator grille and on the radiator, into which a corresponding baffle element is threaded on completion of the installation of the radiator. This baffle element can be designed to be flexible, for example, in particular in the form of a curtain, or, alternatively, to be inflexible in the manner of rigid baffle elements.

Further important features and advantages of the invention will emerge from the dependent claims, the drawings and the associated description of the figures by means of the drawings.

It is self-evident that the features mentioned above and those which remain to be explained below can be used not only in the respectively indicated combination but also in other combinations or in isolation without exceeding the scope of the present invention.

Preferred illustrative embodiments of the invention are shown in the drawings and are explained in greater detail in the following description, wherein identical reference signs refer to identical or similar or functionally identical components.

BRIEF DESCRIPTION OF THE DRAWINGS

In the schematic drawings,

FIG. 1 shows various exploded views of a radiator arrangement according to the invention in a commercial vehicle, FIG. 2 shows an oblique view from above of the radiator arrangement, which is shown as in FIG. 1 but in the installed state.

DETAILED DESCRIPTION

Figure 3:
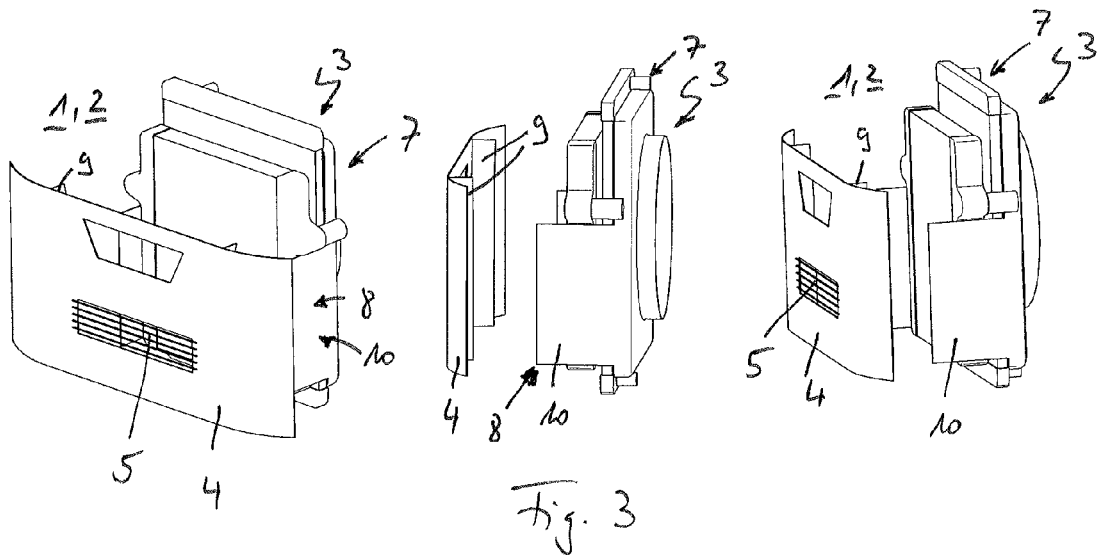
FIG. 3 shows an illustration like that in FIG. 1, but with a different flow-directing device.

According to FIGS. 1 to 7, a motor vehicle 2, which is designed as a commercial vehicle 1 according to the invention, has a radiator arrangement 3, which comprises a radiator grille 4 with a cooling air inlet 5 and comprises a radiator 7 arranged behind the cooling air inlet 5 when viewed in the direction of travel 6. In this case, the radiator 7 can comprise both a coolant cooler 15 and, for example, a charge air cooler 16. The motor vehicle 2 according to the invention likewise comprises a flow-directing device 8, which directs a cooling air flow from the cooling air inlet 5 to the radiator 7.

According to the invention, the flow-directing device 8 is now designed in accordance with three possible alternatives.

Figure 4:
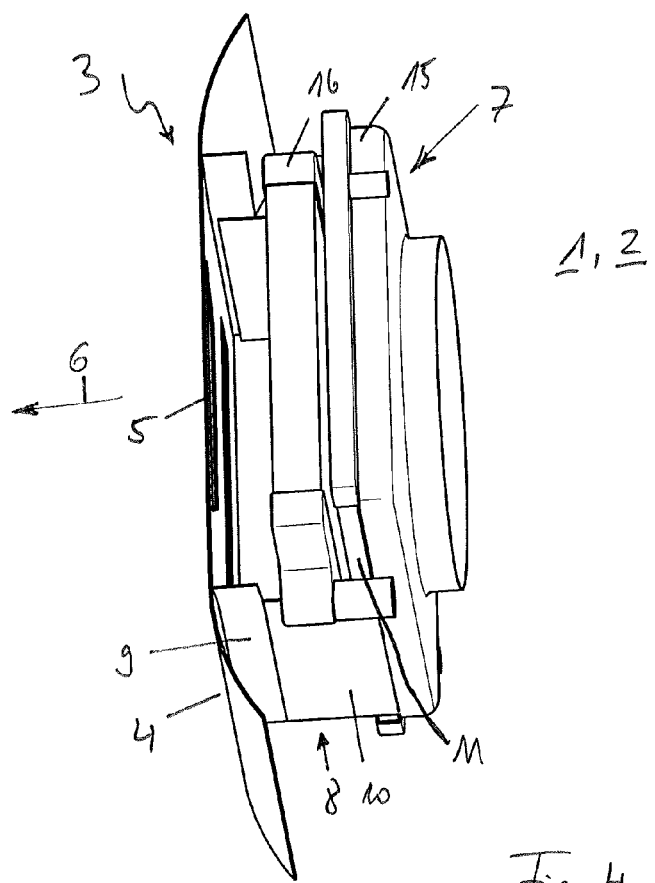
FIG. 4 shows an illustration like that in FIG. 2, but with a different flow-directing device in the installed state.

Here, the first alternative is shown in FIGS. 1 to 5 and shows baffle elements 9 on the radiator-grille side and baffle elements 10 on the radiator side, which overlap in the installed state (cf. FIGS. 2 and 4). In this case, these baffle elements 9, 10 can be connected rigidly to the radiator grille 4 and the radiator 7, respectively, wherein the term "radiator" can be taken to mean either a coolant cooler or a charge air cooler.

When considering the baffle elements 9 on the radiator-grille side and the baffle elements 10 on the radiator side, in accordance with the embodiment in FIG. 1, it can be seen that these are arranged so as to converge, in particular in a V shape, with a spacing which decreases downwards, and thereby simultaneously form a guide for the insertion of the radiator 7 from above. Moreover, the baffle elements 9 on the radiator-grille side and the baffle elements 10 on the radiator side are in surface contact, although, as an alternative, merely linear contact is also conceivable.

Here, the baffle elements 9 on the radiator-grille side are arranged in a fixed manner on the radiator grille 4, in particular even being formed integrally therewith, and, as a result, can be produced in a relatively simple and low-cost manner. In the same way, the baffle elements 10 on the radiator side can also be arranged in a fixed manner on the radiator 7, in particular being formed integrally therewith. Purely theoretically, it is also conceivable, as an alternative, for the baffle elements 9, 10 on the radiator-grille side and/or on the radiator side to be arranged in a fixed manner on a frame 11, in particular even being formed integrally therewith, as shown, for example, in FIGS. 3 and 4.

Figure 5:
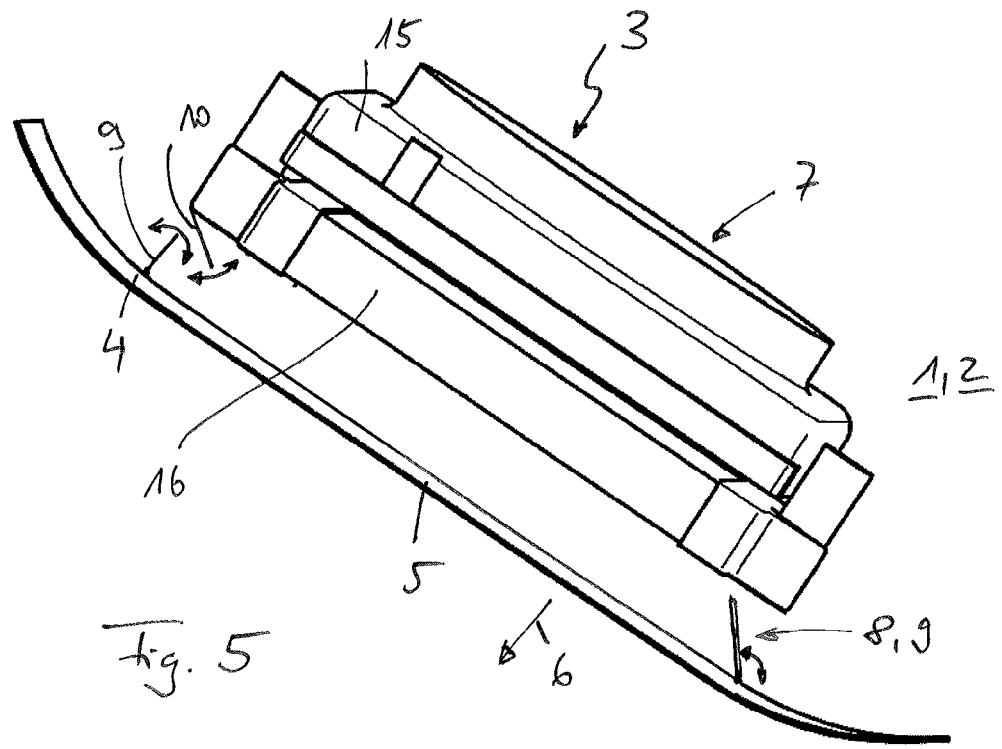
FIG. 5 shows a view from above of a radiator arrangement according to the invention with pivotably arranged baffle elements.

If the flow-directing device 8 shown in FIG. 5 is considered, baffle elements 9, 10 on the radiator-grille side and on the radiator side which are mounted pivotably on the radiator grille 4 and on the radiator 7, respectively, e.g. by means of a film hinge or some other hinge, can be seen there. In this case, an embodiment which has both pivotable baffle elements 9 on the radiator-grille side and pivotable baffle elements 10 on the radiator side is shown on one side, whereas an embodiment in which only baffle elements 10 on the radiator-grille side which are arranged pivotably on the radiator grille 4 are provided is shown on the right-hand side. As an alternative, it is, of course, also conceivable for only a baffle element 10 on the radiator side which is arranged pivotably on the radiator 7 and forms a flow partition between the radiator 7 and the radiator grille 4 in the installed state to be provided.

Figure 6:
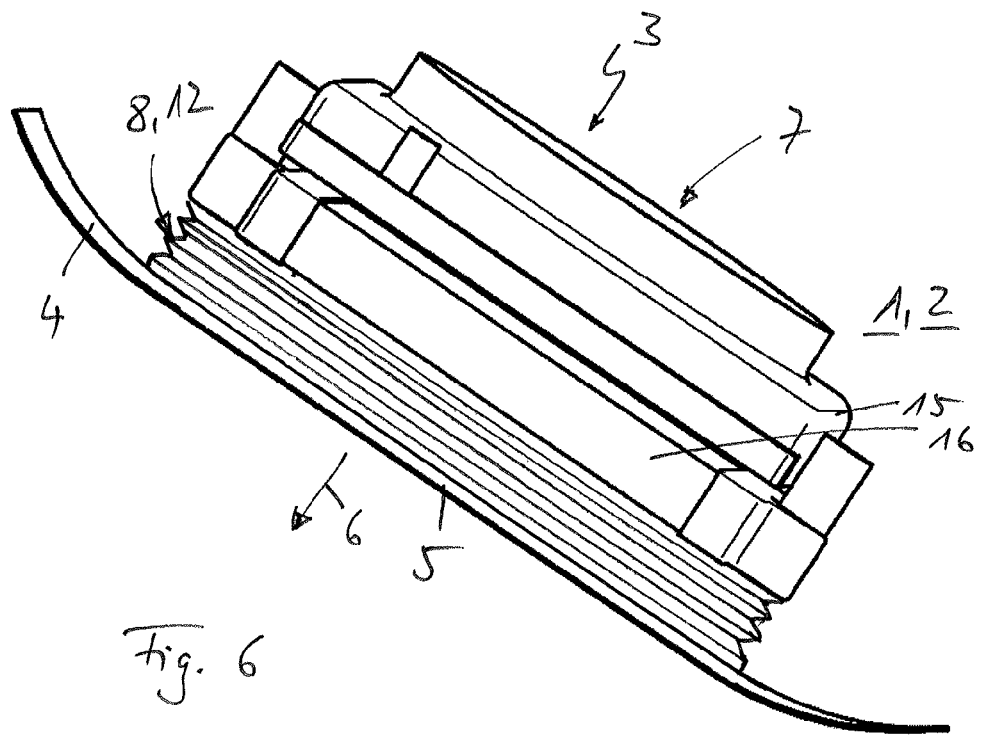
FIG. 6 shows an illustration like that in FIG. 5, but with a flow-directing device designed as a bellows.

If the embodiment in FIG. 6 is considered, which is another alternative thereto, it is possible to see in this embodiment a bellows 12, which, purely theoretically, can also be designed as a flexible frame, and which is extended when the radiator 7 is installed and is then secured on the radiator grille 4, for example, if the bellows 12 is originally arranged on the radiator 7. As an alternative thereto, it is, of course, also conceivable for the bellows 12 to be arranged on the radiator grille 4 and to the extended in the direction of the radiator 7 after the installation of the radiator 7 and to be secured on the latter.

Figure 7:
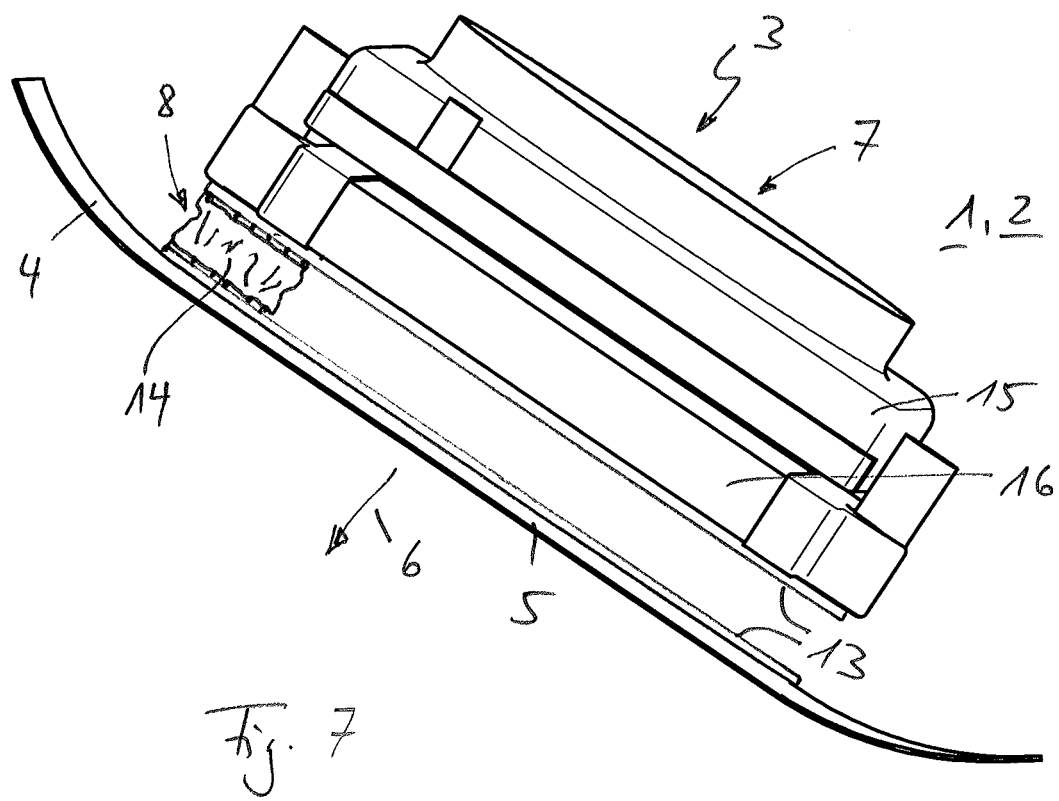
FIG. 7 shows an illustration like that in FIG. 6, but with a flow-directing device having rails and a baffle element that can be moved therein.

FIG. 7, in turn, shows an alternative embodiment of the flow-directing device 8 according to the invention, in which a respective rail 13, in particular a keder rail, in which a baffle element 14 is guided, is arranged both on the radiator 7 and on the radiator grille 4. Here, this baffle element 14 can be designed in the manner of a curtain or can be rigid, a rigid baffle element 14 thus being provided for each side, for example. Purely theoretically, it is also conceivable to design a baffle element 14 of this kind in the manner of a rolling door, which is then threaded in along the keder rails or, in more general terms, along the rails 13 with the radiator 7 installed.

Here, all the embodiments shown have in common that considerably improved air guidance can be achieved by means of the flow-directing device 8 without additional installation work. If the baffle elements 9, 10 are furthermore embodied as guides, installation can thereby also be simplified. The improvement in air guidance has a positive effect on the maximum amount of heat that can be dissipated and shifts the switching on of the fan in the direction of a higher load. It is thereby possible to achieve a significant fuel saving. The part of the air guide which is part of the radiator 7 can be purchased as a product together with the latter or can be offered separately as a retrofitted part.

The invention claimed is:

1. A motor vehicle, comprising: a radiator arrangement including a radiator grille having a cooling air inlet and a radiator arranged behind the cooling air inlet with respect to a forward traveling direction, and a flow-directing device arranged to direct a cooling air flow from the cooling air inlet to the radiator,
wherein the motor vehicle is a commercial vehicle,
wherein the flow-directing device includes at least one of:
at least one baffle element disposed on a radiator-grille side of the radiator arrangement and at least one other baffle element disposed on a radiator side of the radiator arrangement, wherein the at least one baffle element and that at least one other baffle element overlap in an installed state,
a bellows arranged on the radiator-grille side or on the radiator side, wherein the bellows is extended and fixed on the radiator or on the radiator grille when the radiator is installed, and
at least one rail including a guide groove and at least one rail baffle element guided in the at least one guide groove.

2. The motor vehicle according to claim 1, wherein the at least one baffle element on the radiator-grille side and the at least one other baffle element on the radiator side are arranged in a V shape and together define a guide for inserting the radiator.

3. The motor vehicle according to claim 1, wherein the at least one baffle element on the radiator-grille side and the at least one other baffle element on the radiator side are at least in linear contact.

4. The motor vehicle according to claim 1, wherein at least one of:
the at least one baffle element on the radiator-grille side is arranged in a fixed manner on the radiator grille, and
the at least one other baffle element on the radiator side is arranged in a fixed manner on the radiator.

5. The motor vehicle according to claim 1, wherein at least one of the at least one baffle element on the radiator-grille side and the at least one other baffle element on the radiator side are arranged in a fixed manner on a frame.

6. The motor vehicle according to claim 1, wherein at least one of:
the at least one baffle element on the radiator-grille side is arranged pivotably on the radiator grille, and
the at least one other baffle element on the radiator side is arranged pivotably on the radiator.

7. The motor vehicle according to claim 1, wherein the flow-directing device includes the at least one rail, and wherein the at least one rail is a keder rail arranged on the radiator grille and on the radiator, wherein the at least one rail baffle element is threaded into the keder rail after installation.

8. The motor vehicle according to claim 7, wherein the at least one rail baffle element is flexible.

9. The motor vehicle according to claim 8, wherein the at least one rail baffle element is a cloth.

10. The motor vehicle according to claim 7, wherein the at least one rail baffle element is inflexible.

11. The motor vehicle according to claim 1, wherein the flow-directing device includes the bellows, and wherein the bellows is disposed on the radiator.

12. The motor vehicle according to claim 1, wherein the flow-directing device includes the bellows arranged on the radiator side, and wherein the bellows is extended and fixed on the radiator grille when the radiator is installed.

13. The motor vehicle according to claim 1, wherein the flow-directing device includes the bellows arranged on the radiator-grille side, and wherein the bellows is extended and fixed on the radiator.

14. The motor vehicle according to claim 1, wherein the flow-directing device includes the at least one rail, and wherein the at least one rail is a keder rail.

15. The motor vehicle according to claim 2, wherein the at least one baffle element on the radiator-grill side and the at least one other baffle element on the radiator side are in surface contact.

16. The motor vehicle according to claim 2, wherein the at least one baffle element on the radiator-grill side is arranged pivotally attached via a film hinge on the radiator grill.

17. The motor vehicle according to claim 2, wherein the at least one other baffle element on the radiator side is arranged pivotally attached via a film hinge on the radiator.

18. The motor vehicle according to claim 3, wherein the at least one baffle element on the radiator-grille side is arranged in a fixed manner on the radiator grille.

19. The motor vehicle according to claim 18, wherein the at least one other baffle element on the radiator side is arranged in a fixed manner on the radiator.

20. A radiator arrangement, comprising:

a radiator grille on a radiator-grille side and a radiator on a radiator side, wherein the radiator grille includes a cooling air inlet and the radiator is arranged behind the cooling air inlet with respect to a forward traveling direction;

a flow-directing device arranged to direct a cooling air flow from the cooling air inlet to the radiator, wherein the flow-directing device includes at least one of:

at least one baffle element disposed on the radiator-grille side and at least one other baffle element disposed on the radiator side, wherein the at least one baffle element on the radiator-grille side is arranged pivotally on the radiator grille and that at least one other baffle element on the radiator side is arranged pivotally on the radiator, and wherein the at least one baffle element and that at least one other baffle element overlap when the radiator is installed;

a bellows arranged on one of the radiator-grille side and the radiator side, wherein the bellows is extended and fixed on the radiator when the bellows is arranged on the radiator-grille side, and the bellows is extended and fixed on the radiator grille when the bellows is arranged on the radiator side; and at least one rail including a guide groove and at least one rail baffle element guided in the guide groove.

* * * * *